US010320264B2

(12) United States Patent
Nishidate

(10) Patent No.: US 10,320,264 B2
(45) Date of Patent: Jun. 11, 2019

(54) BRUSHLESS MOTOR

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 319 days.

(21) Appl. No.: 15/277,163

(22) Filed: Sep. 27, 2016

(65) Prior Publication Data

US 2017/0141662 A1    May 18, 2017

(30) Foreign Application Priority Data

Nov. 13, 2015 (JP) .................................. 2015-222948
Sep. 1, 2016 (JP) .................................. 2016-170514

(51) Int. Cl.
*H02K 7/08* (2006.01)
*H02K 21/16* (2006.01)
*H02K 21/22* (2006.01)
*H02K 5/167* (2006.01)

(52) U.S. Cl.
CPC .......... *H02K 7/085* (2013.01); *H02K 5/1675* (2013.01); *H02K 21/16* (2013.01); *H02K 21/22* (2013.01); *H02K 2205/03* (2013.01)

(58) Field of Classification Search
CPC ......... H02K 5/1675; H02K 5/16; H02K 7/085
USPC .............................................. 310/90, 89, 91
See application file for complete search history.

(56) References Cited

U.S. PATENT DOCUMENTS

| 9,143,017 | B2* | 9/2015 | Horng | H02K 5/167 |
| 2014/0118859 | A1* | 5/2014 | Yun | G11B 19/2036 360/99.12 |
| 2014/0199189 | A1* | 7/2014 | Tamaoka | F04D 25/062 417/354 |
| 2016/0072358 | A1* | 3/2016 | Roland | H02K 7/025 307/68 |
| 2016/0099631 | A1* | 4/2016 | Kim | H02K 7/086 360/75 |
| 2016/0102672 | A1* | 4/2016 | Liu | G04D 29/058 417/423.12 |

FOREIGN PATENT DOCUMENTS

| CA | 2796481 A1 * | 10/2013 | ............. A45D 20/12 |
| JP | 2532489 | 4/1997 | |

OTHER PUBLICATIONS

U.S. Appl. No. 15/286,926, Masahiro Nishidate, filed Oct. 6, 2016.
U.S. Appl. No. 15/287,029, Masahisa Tuchiya, filed Oct. 6, 2016.

* cited by examiner

*Primary Examiner* — Forrest M Phillips
(74) *Attorney, Agent, or Firm* — Jordan and Koda, PLLC

(57) ABSTRACT

A cover member has a through hole in the center. A rotary shaft protrudes upward from the through hole, without contact with the cover member. A first washer member, which is made from a hard material, is fastened to the rotary shaft, between the rotor case and the cover member. The first washer member is disposed without contact with the rotor case and the cover member.

20 Claims, 5 Drawing Sheets

BRUSHLESS MOTOR

BACKGROUND OF THE INVENTION

The present invention relates to a brushless motor, which can be used, for example as an electric motor provided with a reduction mechanism for feeding paper money that has been inserted into a vending machine into a paper money transport path.

For example, Japanese Utility Model Registration Publication No. 2532489 describes a brushless motor covered by a frame (cover member). In this brushless motor an armature core (stator core) is fastened to the outside of an insulator (bearing holder), which is fastened to a printed circuit board (retaining plate), and a magnet (rotor magnet) that faces the outside of this armature core is fastened to the inner circumferential face of a rotor frame (rotor case). A rotary shaft that is fastened to the center of this rotor frame is supported by an oil-impregnated sintered bearing that is fastened to the center of the frame, and by an oil-impregnated sintered bearing that is fastened to the printed circuit board, and the top end of the rotary shaft protrudes from the frame.

However, in Japanese Utility Model Registration Publication No. 2532489, cumulative manufacturing variations in the dimensions of the parts result in large variations in the amount by which the rotor frame moves in the thrust direction (thrust play).

That is to say, the printed circuit board, the insulator and the armature core are each manufactured with tolerances in the axial dimensions of the parts and, in the assembly process, these tolerances are cumulative, such that there will be a greater dimensional tolerance in mounting the rotor frame, on which the magnet that faces this armature core is fastened, on the rotary shaft. Consequently, there will be great variation in the thrust play (gap in the thrust direction) between the rotor frame that is fastened to the rotary shaft and the oil-Impregnated sintered bearing that is fastened to the center of the frame.

SUMMARY OF THE INVENTION

The present invention is directed to providing a brushless motor that can solve the problems described above and limit variation in thrust play.

A first aspect of the present invention relating to a brushless motor comprises:

a bearing holder, which has a first cylindrical part and a bottom that closes the bottom end of the first cylindrical part;

a first oil-impregnated bearing fastened to an inner circumferential face of the first cylindrical part;

a rotary shaft rotatably supported by the first oil-impregnated bearing;

a rotor having a rotor case, which is fastened to the rotary shaft and has a second cylindrical part and a top plate that closes the top end of the second cylindrical part, and a rotor magnet fastened to a circumferential face of the second cylindrical part;

a stator, arranged so as to face the rotor magnet in the radial direction;

a retaining plate that extends outward in the radial direction from said bottom; and a cover member, which has a third cylindrical part and a roof that closes the top end of the third cylindrical part, the bottom end of the third cylindrical part being fastened to the retaining plate, so as to cover the rotor and the stator, wherein, the cover member has a through hole in the center of the roof;

the rotary shaft protrudes upwards from the through hole without contact with the roof;

a first washer member, which is made from a hard material and has a flat face, is fastened to the rotary shaft, between the top plate and the roof; and the first washer member is disposed without contact with the top plate and the roof.

A second aspect of the present invention relating to a brushless motor comprises:

a bearing holder, which has a first cylindrical part and a bottom that closes the bottom end of the first cylindrical part;

a first oil-impregnated bearing fastened to an inner circumferential face of the first cylindrical part;

a rotary shaft rotatably supported by the first oil-impregnated bearing;

a rotor having a rotor case, which is fastened to the rotary shaft and has a second cylindrical part and a top plate that closes the top end of the second cylindrical part, and a rotor magnet fastened to a circumferential face of the second cylindrical part;

a stator, arranged so as to face the rotor magnet in the radial direction;

a retaining plate that extends outward in the radial direction from said bottom; and a cover member, which has a third cylindrical part and a roof that closes the top end of the third cylindrical part, the bottom end of the third cylindrical part being fastened to the retaining plate, so as to cover the rotor and the stator; and a second oil-impregnated bearing, wherein, the cover member has a cylinder in the center of the roof;

the second oil-impregnated bearing is fastened to the cylinder;

the rotary shaft protrudes upward from the cylinder, without contact with the second oil-impregnated bearing;

a first washer member, which is made from a hard material and has a flat face, is fastened to the rotary shaft, between the top plate and the second oil-impregnated bearing; and the first washer member is disposed without contact with the top plate or the second oil-impregnated bearing.

With the present invention, variation in thrust play can be reduced. Note that, in the present specification, thrust play refers to the distance that the rotary shaft can travel in the axial direction.

DETAILED DESCRIPTION OF THE PREFERRED EMBODIMENTS

In the present specification, upward in the central axial direction of the motor in FIG. 1 to FIG. 5 is referred to simply as "upward" and downward in the central axial direction of the motor in FIG. 1 to FIG. 5 is referred to simply as "downward." Note that, the upward and downward directions do not indicate positional relationships or directions when the actual device is assembled. Furthermore, the direction parallel to the central axis is referred to as the "axial direction," the radial direction having the central axis as its center is referred to simply as the "radial direction," and the circumferential direction having the central axis as its center is referred to simply as the "circumferential direction."

Hereinafter modes of embodiment of the present invention are illustratively described based on the drawings.

First Exemplary Mode of Embodiment

Figure 1:
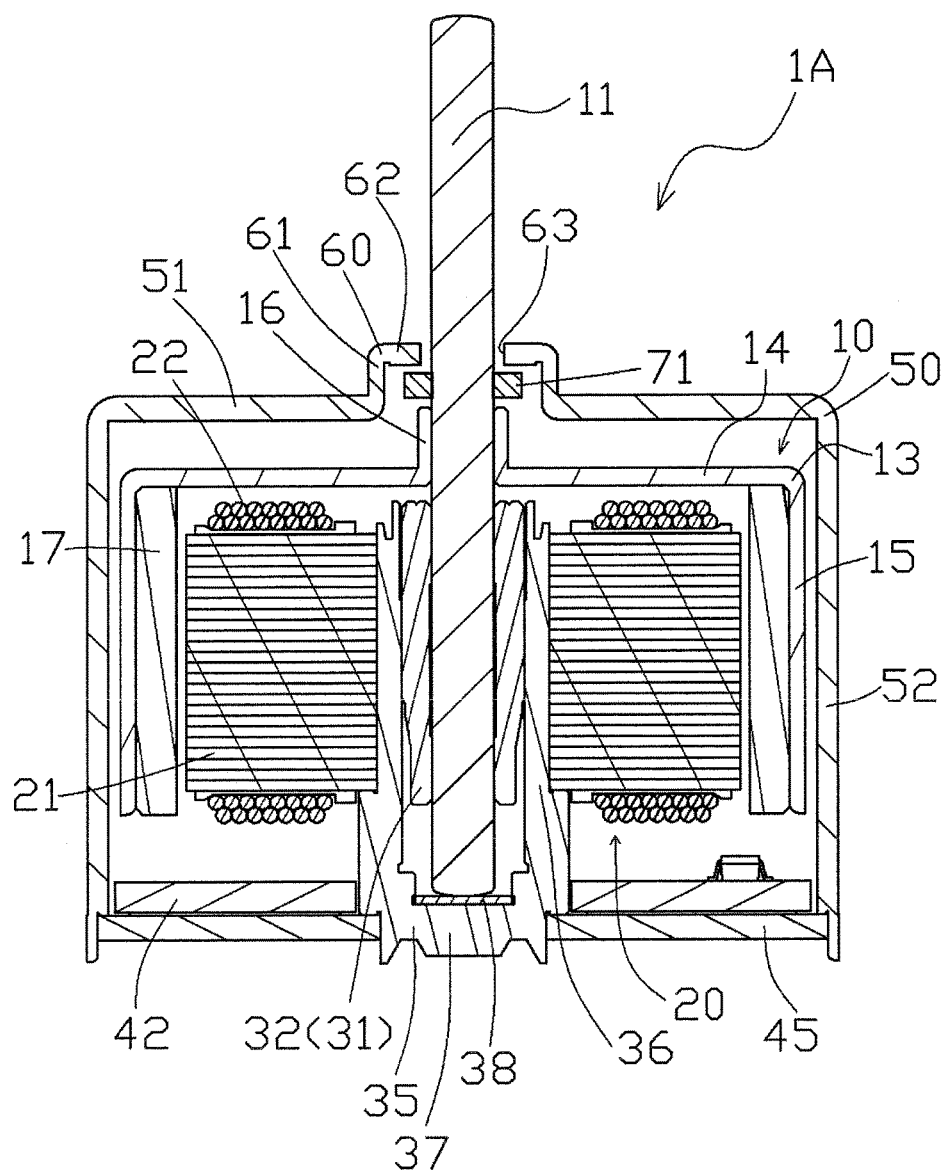
FIG. 1 is a sectional view of a brushless motor according to a first exemplary mode of embodiment of the present invention.

First, the configuration of a brushless motor 1A according to a first exemplary mode of embodiment of the present invention is described by way of FIG. 1. In the first exemplary mode of embodiment, an outer-rotor type brushless motor 1A is described, which is covered by a cover member 50.

As shown in FIG. 1, the brushless motor 1A in this example comprises a rotor 10, a rotary shaft 11, a stator 20, a bearing 31, a bearing holder 35, a retaining plate 45, and a cover member 50. The rotor 10 comprises a rotor case 13 and a rotor magnet 17. The stator 20 comprises a stator core 21 and coils 22.

The bearing 31 is a radial bearing that bears the radial load of the rotary shaft 11 and, in this example, comprises a first oil-impregnated bearing 32, which is cylindrical. Note that an oil-impregnated sintered body, and oil-impregnated resin or the like can be used for the first oil-impregnated bearing 32.

The bearing holder 35 is formed from a metallic material, and has a cylindrically shaped first cylindrical part 36 and a bottom 37, which closes the bottom end of the first cylindrical part 36. The first oil-impregnated bearing 32 is fastened to the inner circumferential face of the first cylindrical part 36. A thrust receiving material 38, which receives the thrust load of the rotary shaft 11, is disposed on the top face of the bottom 37.

The rotary shaft 11 is supported by the first oil-impregnated bearing of 32 and the bearing holder 35 so as to be able to rotate around the center axis that is oriented in the vertical direction, the rotary shaft 11 being formed from metal, in the shape of an elongate cylinder.

The rotor case 13 rotates united with the rotary shaft 11. The rotor case 13 has a cylindrically shaped second cylindrical part 15, and a top plate 14, which closes the top end of the second cylindrical part 15, a drive rotor magnet 17 being provided on the inner circumferential face of the second cylindrical part 15. A burring part 16, which results from drawing, and fastens the rotary shaft 11, rises upward in the center of the top plate 14 of the rotor case 13. The rotary shaft 11 is fastened by way of press fitting into this burring part 16.

The stator 20 is arranged so as to face the rotor magnet 17 in the radial direction. Specifically, the stator 20 has a stator core 21 that is fastened to the outer circumferential face of the first cylindrical part 36 of the bearing holder 35, and is disposed so as to face the inner circumferential face of the rotor magnet 17, in the radial direction. The stator core 21 is made from a laminate in which a plurality of core plates are laminated, and has a plurality of equidistant salient poles at the outer circumference thereof. Coils 22 are respectively wound on each of the salient polls. The stator core 21 serves to strengthen the magnetic flux when current is passed through the coils 22.

The rotor magnet 17 is disposed facing the salient polls on the stator core 21, and generates a rotational force in the rotor 10. This rotor magnet 17 is formed in the shape of a ring, and is alternatingly magnetized with North and South poles, in the circumferential direction.

The retaining plate 45 is formed from a metallic material in a plate shape, and is formed so as to extend in the radial direction from the bottom 37, which is part of the outer circumferential face of the bearing holder 35. The external profile of the retaining plate 45 is formed so as to be larger than the outer diameter of the rotor case 13, in the radial direction.

A wiring board 42, which supplies the coils 22 with externally applied electric power, is fastened to the top face of this retaining plate 45. Furthermore, the retaining plate 45 and the wiring board 42 have through holes in the approximate centers thereof, having substantially the same circular form as the outer circumferential faces of the bearing holder 35, and the bottom 37 of the bearing holder 35 is fastened in these through holes.

The cover member 50 is formed from a hard material and covers the rotor 10 and the stator 20 from above. The cover member 50 has a cylindrically shaped third cylindrical part 52, and a roof 51, which closes the top end of the third cylindrical part 52, and the bottom end of the third cylindrical part 52 is fastened to the outer circumference of the retaining plate 45. The cover member 50 prevents dust or the like from getting into the motor, by covering the rotor 10 and the stator 20 from above.

A cylindrically shaped part 60 is provided in the center of the roof 51 of the cover member 50. This cylindrically shaped part 60 has a cylinder 61 and an end plate 62 provided at the top end of the cylinder 61, and protrudes upward from the roof 51, united with the cover member 50.

The cover member 50 has a through hole 63 in the center of the roof 51 (which is to say, in the center of the end plate 62 of the cylindrically shaped part 60). The diameter of this through hole 63 is formed greater than the outer diameter of the rotary shaft 11, and smaller than the outer diameter of the burring part 16. The rotary shaft 11 protrudes upwards from the through hole 63 without contact with the roof 51. Note that, if the brushless motor 1A in this example is used as a motor with a reduction mechanism, for example, a drive gear (not illustrated) is fastened to the portion of the rotary shaft 11 that protrudes upward from the cover member 50.

A first washer member 71, which is made from a metallic or resinous hard material, is fastened to the rotary shaft 11, between the top plate 14 and the roof 51. This first washer member 71 is disposed without contact with the end plate 62 of the roof 51. That is to say, the first washer member 71 is disposed with a gap in the axial direction between the first washer member 71 and the cover member 50. This first washer member 71 is provided so as to reduce variation in thrust play.

Furthermore, the first washer member 71 is disposed without contact with the top end of the burring part 16. That is to say, the first washer member 71 is disposed with a gap in the axial direction between the first washer member 71 and the rotor case 13.

The first washer member 71 suitably has flat faces having high degrees of flatness on the top face and the bottom face, and is formed so that the outer profile is circular, for example, by press working a thin flat piece of metal.

The outer diameter of the first washer member 71 is formed larger than the diameter of the through hole 63 in the cover member 50, and smaller than the inner diameter of the cylinder 61 of the cylindrically shaped part 60. Furthermore, the outer diameter of the first washer members 71 is formed larger than the outer diameter of the burring part 16.

Furthermore, the inner diameter of the first washer member 71 is formed slightly smaller than the outer diameter of the rotary shaft 11. When the first washer member 71 has been fastened by way of press fitting on the rotary shaft 11, the first washer 71 rotates united with the rotary shaft 11. The first washer member 71 is enclosed by the cylindrically shaped part 60, and disposed without contact with the inner circumferential face of the cylinder 61.

Note that the rotary shaft 11, the first oil-impregnated bearing 32, the burring part 16, the first washer member 71 and the through hole 63 are disposed coaxially.

Next, the method of assembling the brushless motor 1A in this example will be described.

The rotary shaft 11, the rotor case 13, the rotor magnet 17 and the first washer member 71 are prepared.

First, the rotary shaft 11 is fastened by way of press fitting into the burring part 16 of the rotor case 13. The rotor magnet 17 is fastened, from the bottom, to the inner circumferential face of the second cylindrical part 15 of the rotor case 13 that is fastened to the rotary shaft 11 (resulting in a rotor 10 having a rotary shaft 11). Then, the first washer member 71 having top and bottom faces with high degrees of flatness is press fit, from above, onto the rotary shaft 11 to which the rotor case 13 is fastened, by pushing the top face in such a way as not to contact the burring part 16 of the rotor case 13 (resulting in a first assembly).

Next, the stator core 21, the coils 22, the first oil-impregnated bearing 32, the bearing holder 35, the thrust receiving member 38, the wiring board 42 and the retaining plate 45 are prepared.

First, the coils 22 are wound on to the salient polls of the stator core 21 (resulting in a stator 20). Next, the thrust receiving member 38 is disposed on the bottom 37 of the individual bearing holder 35. Then, the first oil-impregnated bearing 32 is press fit into the opening in the bearing holder 35 so as to be fastened to the inner circumferential face thereof. Next, the stator 20 is fastened, from above, to the outer circumferential face of the first cylindrical part 36 of the bearing holder 35. Next, the retaining plate 45 having the wiring board 42 is fastened to the bottom 37 of the bearing holder 35 (resulting in a second assembly).

Next, the cover member 50 is prepared (resulting in a third assembly).

Next, the bottom end of the rotary shaft 11 in the first assembly is inserted from above into the first oil-impregnated bearing 32 in the second assembly, whereby the first assembly and the second assembly are assembled with the rotary shaft 11 supported by the first oil-impregnated bearing 32. In this state, the cover member 50 of the third assembly covers the rotor 10 and the stator 20, and the bottom end of the third cylindrical part 52 of the cover member 50 is fastened to the outer circumference of the retaining plate 45. Consequently, the rotary shaft 11 protrudes upwards from the cover member 50, and the cantilevered bearing brushless motor 1A is complete.

When the brushless motor 1A in this example is provided with electrical power from the wiring board 42, the coils 22 are excited, whereby the rotor magnet 17 is subjected to force, and the rotor 10 rotates. Furthermore, with the brushless motor 1A in this example, with the bottom end of the rotary shaft 11 abutting the thrust receiving member 38, there is a small gap in the axial direction between the first washer member 71 and the cover member 50 (corresponding to the thrust play). Then, if an upward force of greater than or equal to a predetermined magnitude acts on the rotary shaft 11, the first assembly moves upward, and the first washer member 71 comes into contact with the end plate 62 of the cylindrically shaped part 60.

Thus, in the brushless motor 1A of this example, a first washer member 71, which is made from a hard material and has flat faces, is fastened to the rotary shaft 11 between the top plate 14 of the rotor case 13 and the roof 51 of the cover member 50, and this first washer member 71 is disposed without contact with the top plate 14 or the roof 51.

Accordingly, the thrust play of the brushless motor 1A in this example corresponds to the gap between the first washer member 71 and the end plate 62.

In this example, the first washer member 71 is fastened to the rotary shaft 1 by press fitting, so as not to be in contact with the top plate 14 of the rotor case 13. Consequently, the first washer members 71 is fastened to the rotary shaft 11, without being impacted by the dimensional tolerance between the bottom end of the rotary shaft 11 and the top plate 14 of the rotor case 13. Further, because the first washer member 71 has a flat face having a high degree of flatness on the top face thereof, when fastened by press fitting onto the rotary shaft 11, the dimensional tolerance from the bottom end of the rotary shaft 11 to the top face of the first washer member 71 can be minimized. Accordingly, it is possible to limit variation in the gap between the first washer member 71 and the end plate 62, and thus reduce variation in the thrust play.

Furthermore, the burring part 16 on the rotor case 13 is provided in order to increase the rotary shaft retraining strength when the rotary shaft 11 is fastened in the rotor case 13.

Supposing that the first washer member 71 was fastened in place on the rotary shaft 11 so as to make contact with the top end of the burring part 16, the dimensional tolerance from the bottom end of the rotary shaft 11 to the first washer member 71 would be impacted by the dimensional tolerance from the bottom end of the rotary shaft 11 to the top plate 14 of the rotor case 13, and by the dimensional tolerance from the bottom end of the burring part 16 to the top end, and thus the variation in the thrust play would be greater.

Meanwhile, in the brushless motor 1A in this example, the first washer member 71 is disposed without contacting the top end of the burring part 16. Consequently, the dimensional tolerance from the bottom end of the rotary shaft 11 to the first washer member 71 is not influenced by the dimensional tolerance from the bottom end of the rotary shaft 11 to the top plate 14 of the rotor case 13, or the dimensional tolerance from the bottom end of the burring part 16 to the top end. Accordingly, with the brushless motor 1A in this example, the dimensional tolerance from the bottom end of the rotary shaft 11 to the first washer member 71 is decreased and thus the variation in the thrust play will be decreased.

Furthermore, the burring part 16 of the rotor case 13 can be formed either in the upward direction or the downward direction, but in this example, the burring part 16 rises upward direction. The reason for this is that, in the present example, the rotary shaft 11 is supported by a single bearing (first oil-impregnated bearing 32) and thus shaft vibration is likely to occur, and by having the burring part 16 rise upwards, the axial length of the first oil-impregnated bearing 32 can be increased, whereby the shaft vibration can be suppressed.

Thus, because the burring part 16 that fastens the rotary shaft 11 rises upward, the retaining strength when the rotor case 13 is fastened on the rotary shaft 11 can be increased, while the shaft vibration can be decreased.

Second Exemplary Mode of Embodiment

Figure 2:
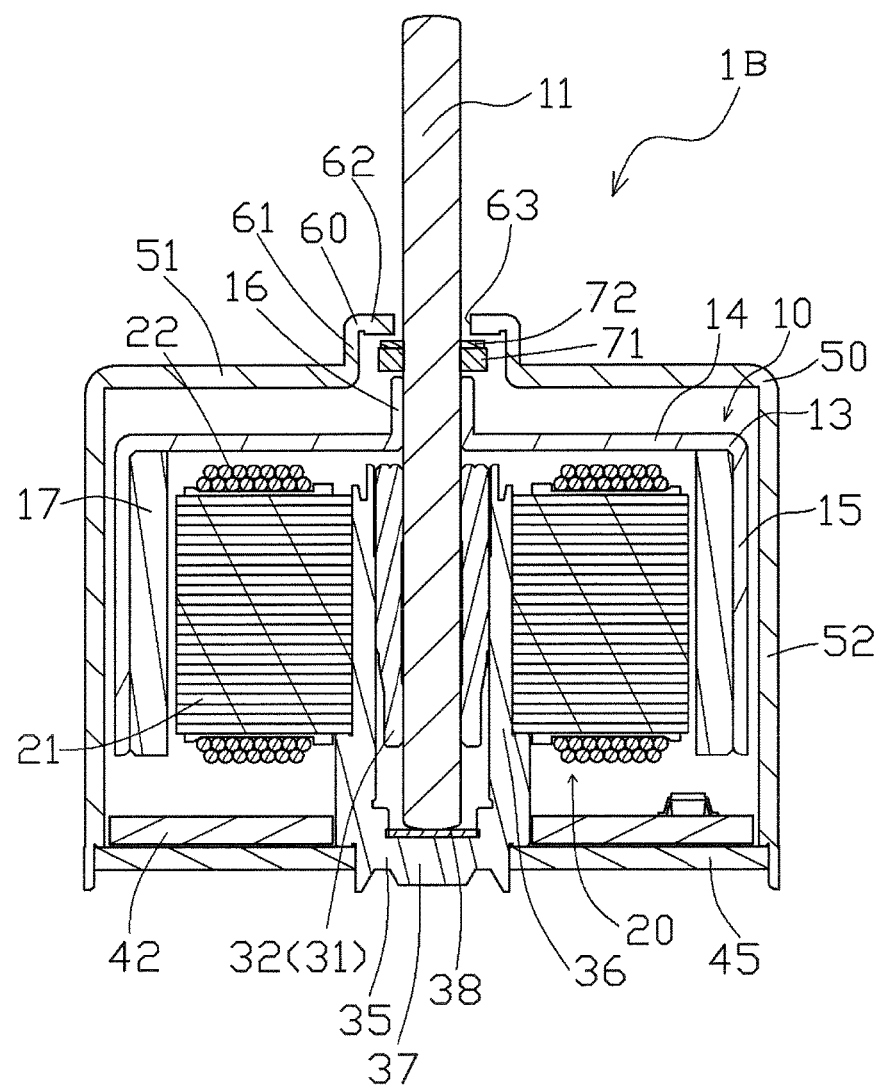
FIG. 2 is a sectional view of a brushless motor according to a second exemplary mode of embodiment of the present invention.

Next, the configuration of a brushless motor 1B according to a second exemplary mode of embodiment of the present invention is described by way of FIG. 2.

In FIG. 2, parts that are the same as parts in FIG. 1 are given identical reference numerals, and description of these parts is omitted.

In the first exemplary mode of embodiment, when the rotary shaft 11 moves upward, the first washer member 71, which is made from a hard material, comes into contact with the end plate 62 of the cylindrically shaped part 60. Meanwhile, in this example, a second washer member 72, which is made from a soft material, is provided on the rotary shaft 11, between the first washer member 71 and the end plate 62 of the cylindrically shaped part 60, in order to limit the noise of the impact between the first washer member 71 and the end plate 62 of the cylindrically shaped part 60, when the rotary shaft 11 moves upwards.

The second washer member 72 is one wherein a thin flat plate made from resin is press worked so as to form the outer profile in a circular shape, and has flat faces with high degrees of flatness on the top and bottom faces. The outer diameter of the second washer member 72 is formed smaller than the outer diameter of the first washer member 71. The outer diameter of the second washer member 72 is formed larger than the diameter of the through hole 63, and smaller than the inner diameter of the cylinder 61.

The inner diameter of the second washer member 72 is formed substantially the same as the outer diameter of the rotary shaft 11. When the second washer member 72 has been press fit onto the rotary shaft 11, the second washer 72 rotates united with the rotary shaft 11 and with the first washer member 71. The second washer member 72 is arranged in contact with the top face of the first washer member 71. Furthermore, the second washer member 72 is arranged without contact with the end plate 62 of the roof 51. That is to say, the second washer member 72 is disposed with a gap between the second washer member 72 and the cover member 50, in the axial direction.

The thrust play of the brushless motor 1B having the configuration described above corresponds to the gap between the second washer member 72 and the end plate 62.

In this example as well, the first washer member 71 is fastened to the rotary shaft 11, without being influenced by the dimensional tolerance between the bottom end of the rotary shaft 11 and the top plate 14 of the rotor case 13. Furthermore, the second washer member 72 is made from a soft material having flat faces, with a high degree of flatness, on the top and bottom faces thereof, and is arranged in contact with the top face of this first washer member 71. Accordingly, it is possible to limit variation in the gap between the second washer member 72 and the end plate 62, and thus reduce variation in the thrust play.

Furthermore, in the brushless motor 1B in this example as well, the burring part 16 rises upward, which increases the retaining strength when the rotor case 13 is fastened to the rotary shaft 11, while allowing for an increase in the axial length of the first oil-impregnated bearing 32, which makes decreased shaft vibration possible.

Furthermore, in the brushless motor 1B in this example, when the rotary shaft 11 moves upwards, the hard-material first washer member 71 does not come into contact with the top plate 62, but rather the second washer member 72, which is made from a soft material, comes into contact with the end plate 62, allowing for a reduction in the impact sound caused by thrust play.

Third Exemplary Mode of Embodiment

Figure 3:
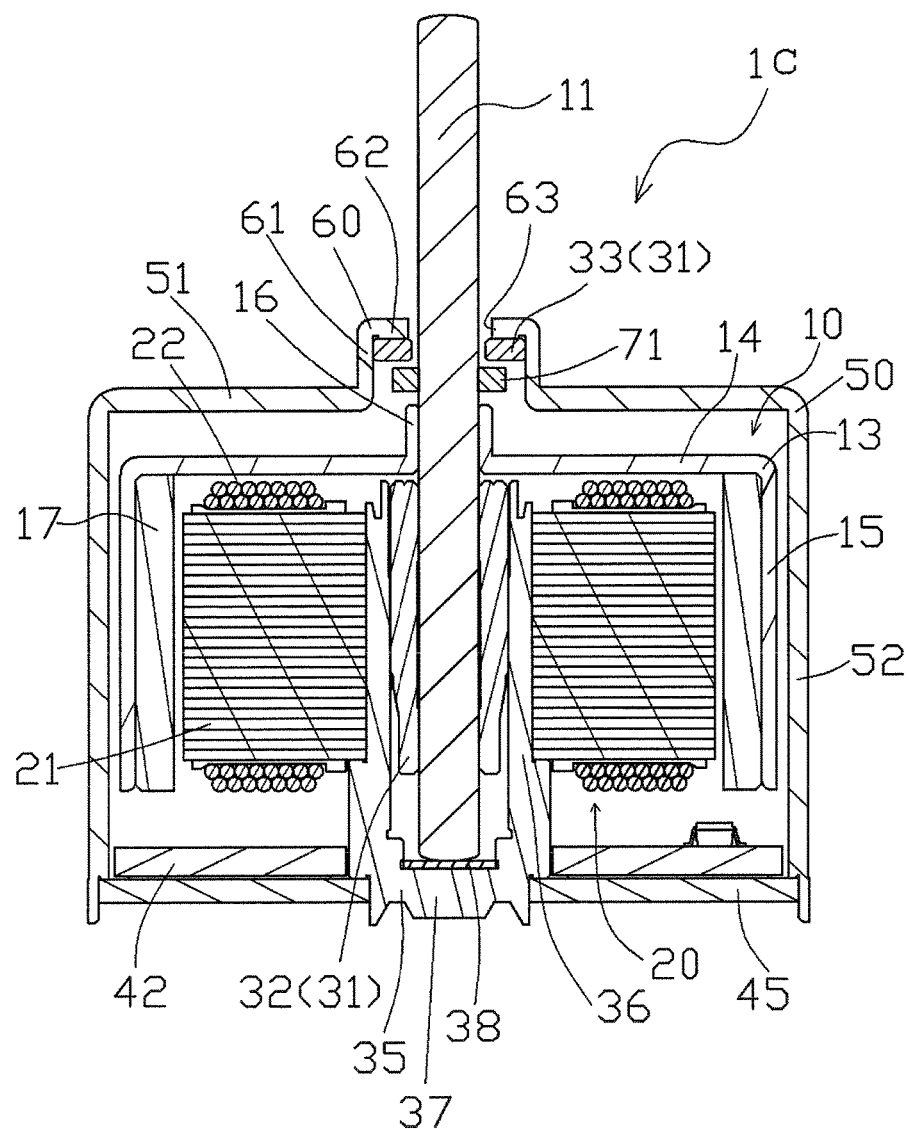
FIG. 3 is a sectional view of a brushless motor according to a third exemplary mode of embodiment of the present invention.

Next, the configuration of a brushless motor 1C according to a third exemplary mode of embodiment of the present invention is described by way of FIG. 3.

In FIG. 3, parts that are the same as parts in FIG. 1 are given identical reference numerals, and description of these parts is omitted.

In the first exemplary mode of embodiment, when the rotary shaft 11 moves upward, the first washer member 71 comes into contact with the end plate 62. Meanwhile, in this example, a second oil-impregnated bearing 33 is fastened to the cylinder 61 on the cylindrically shaped part 60, such that when the rotary shaft 11 moves upward, the first washer member 71 comes into contact with the second oil-impregnated bearing 33.

The bearing 31 in this example comprises the first oil-impregnated bearing 32 and the second oil-impregnated bearing 33. Note that an oil-impregnated sintered body, and oil-impregnated resin or the like can be used for the second oil-impregnated bearing 33.

The second oil-impregnated bearing 33 is fastened to the inner circumference of the cylinder 61 of the cylindrically shaped part 60. The outer circumferential face of the second oil-impregnated bearing 33 is in contact with the inner circumferential face of the cylinder 61 of the cylindrically shaped part 60, and the top face of the second oil-impregnated bearing 33 is in contact with the bottom face of the end plate 62.

The first oil-impregnated bearing 32 and the second oil-impregnated bearing 33 are disposed coaxially. The inner diameter of the second oil-impregnated bearing 33 is formed slightly larger than the inner diameter of the first oil-impregnated bearing 32.

Furthermore, the through hole 63 in the end plate 62 of the cylindrically shaped part 60 and the second oil-impregnated bearing 33 are disposed coaxially. Furthermore, the diameter of the through hole 63 is formed larger than the inner diameter of the second oil-impregnated bearing 33.

Further, the axial length of the cylinder 61 is longer than the axial length of the second oil-impregnated bearing 33. The configuration is such that, when the second oil-impregnated bearing 33 is inserted at the interior of the cylindrically shaped part 60, so as to be fastened there, the second oil-impregnated bearing 33 is provided at the center of the roof 51 of the cover member 50. Furthermore, the rotary shaft 11 protrudes upward from the second oil-impregnated bearing 33 without contact with the second oil-impregnated bearing 33.

Furthermore, the outer diameter of the first washer member 71 is formed larger than the inner diameter of the second oil-impregnated bearing 33, and smaller than the outer diameter of the second oil-impregnated bearing 33.

Furthermore, the first washer member 71 is disposed without contact with the second oil-impregnated bearing 33. That is to say, the first washer member 71 is disposed with a gap between the first washer member 71 and the second oil-impregnated bearing 33, in the axial direction.

Thus, in the brushless motor 1C in this example, the rotary shaft 11 protrudes upwards from the second oil-impregnated bearing 33, without contact with the second oil-impregnated bearing 33. Furthermore, the first washer member 71 is fastened to the rotary shaft between the top plate 14 and the second oil-impregnated bearing 33. Furthermore, the first washer member 71 is disposed without contact with the top plate 14 and the second oil-impregnated bearing 33.

Accordingly, the thrust play of the brushless motor 1C in this example corresponds to the gap between the first washer member 71 and the second oil-impregnated bearing 33.

In this example as well, the first washer member 71 is fastened to the rotary shaft 11, without being impacted by the dimensional tolerance between the bottom end of the rotary shaft 11 and the top plate 14 of the rotor case 13. Accordingly, it is possible to limit variation in the gap between the first washer member 71 and second oil-impregnated bearing 33, and thus reduce variation in the thrust play.

Furthermore, in the brushless motor 1C in this example as well, the burring part 16 rises upward, which increases the retaining strength when the rotor case 13 is fastened to the rotary shaft 11, while allowing for an increase in the axial length of the first oil-impregnated bearing 32, which makes decreased shaft vibration possible.

Furthermore, in the brushless motor 1C in this example, the top face of the second oil-impregnated bearing 33 is in contact with the end plate 62. Accordingly, when the rotary shaft 11 moves upwards, and thus the first washer member 72 comes into contact with the second oil-impregnated bearing 33, the end plate 62 stops the second oil-impregnated bearing 33, allowing for greater retaining strength for the second oil-impregnated bearing 33 in the axial direction, which allows for greater durability.

Furthermore, in the brushless motor 1C in this example, the inner diameter of the second oil-impregnated bearing 33 is formed slightly larger than the inner diameter of the first oil-impregnated bearing 32, such that, when driven under ordinary loads, the rotary shaft 11 is supported only by the first oil-impregnated bearing 32. Furthermore, when an excess load that exceeds normal loads is applied in the radial direction to the rotary shaft 11, from a non-illustrated driver gear, the rotary shaft 11 is supported by two bearings, these being the first oil-impregnated bearing 32 and the second oil-impregnated bearing 33.

Furthermore, when an excess load that exceeds normal loads applied in the axial direction to the rotary shaft 11, from a non-illustrated drive gear, because the first washer member 71 is in sliding contact with the second oil-impregnated bearing 33, the sliding resistance can be reduced as compared to cases such as in the first exemplary mode of embodiment, in which the first washer member 71 is in sliding contact with the end plate 62.

Fourth Exemplary Mode of Embodiment

Figure 4:
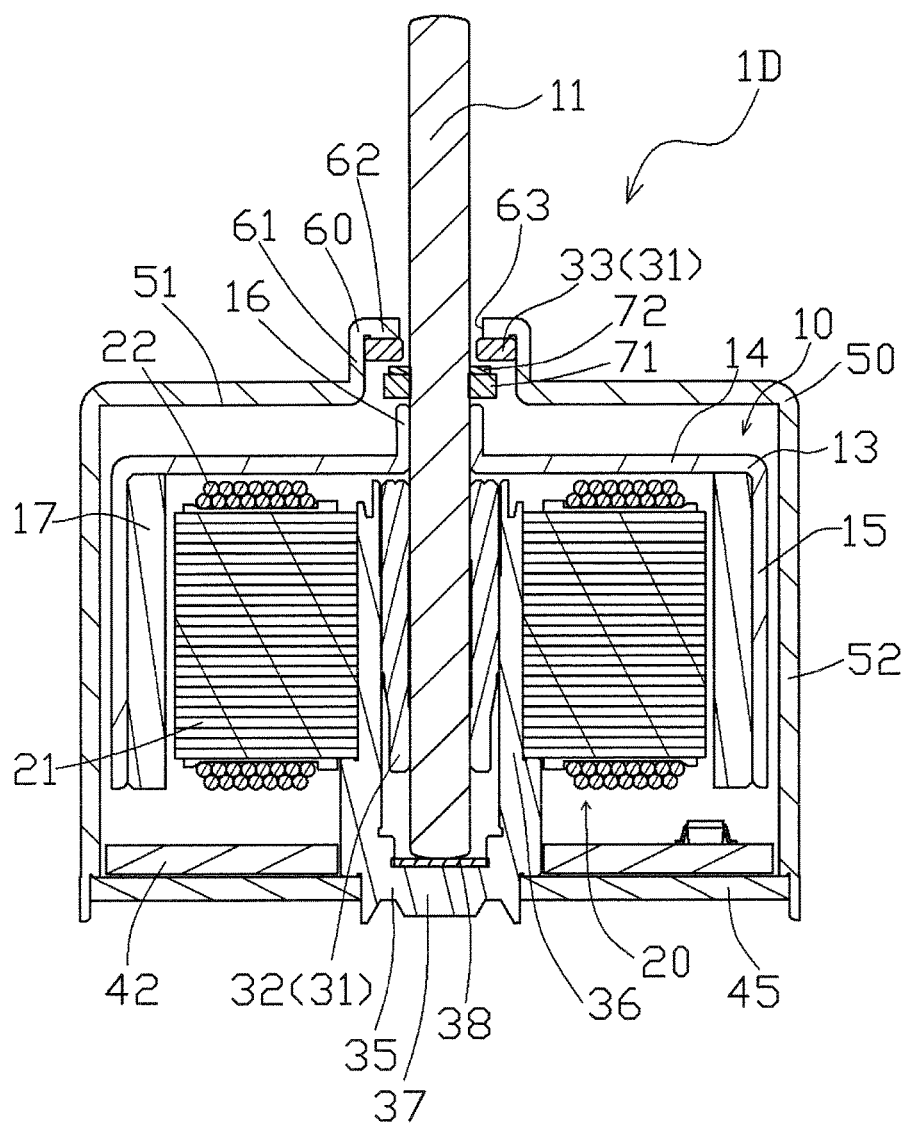
FIG. 4 is a sectional view of a brushless motor according to a fourth exemplary mode of embodiment of the present invention.

Next, the configuration of a brushless motor 1D according to a fourth exemplary mode of embodiment of the present invention is described by way of FIG. 4.

In FIG. 4, parts that are the same as parts in FIG. 3 are given identical reference numerals, and description of these parts is omitted.

In the third exemplary mode of embodiment, when the rotary shaft 11 moves upward, the first washer member 71, which is made from a hard material, comes into contact with the second oil-impregnated bearing 33. Meanwhile, in this example, a second washer member 72, which is made from a soft material, is provided on the rotary shaft 11, between the first washer material 71 and the second oil-impregnated bearing 33, in order to limit the noise of the impact between the first washer member 71 and the second oil-impregnated bearing 33, when the rotary shaft 11 moves upwards.

The second washer member 72 is the same as that described in the second exemplary mode of embodiment.

The outer diameter of this second washer member 72 is formed larger than the inner diameter of the second oil-impregnated bearing 33, and smaller than the outer diameter of the second oil-impregnated bearing 33.

When the second washer member 72 has been press fit onto the rotary shaft 11, the second washer 72 rotates united with the rotary shaft 11 and with the first washer member 71. The second washer member 72 is arranged in contact with the top face of the first washer member 71. Furthermore, the second washer member 72 is arranged without contact with the second oil-impregnated bearing 33. That is to say, the second washer member 72 is disposed with a gap between the second washer member 72 and the second oil-impregnated bearing 33, in the axial direction.

The first washer member 71 and the second washer member 72 are enclosed within the cylindrically shaped part 60, and disposed without contact with the inner circumferential face of the cylinder 61.

The thrust play of the brushless motor 1D having the configuration described above corresponds to the gap between the second washer member 72 and the second oil-impregnated bearing 33.

In this example as well, the first washer member 71 is fastened to the rotary shaft 11, without being influenced by the dimensional tolerance between the bottom end of the rotary shaft 11 and the top plate 14 of the rotor case 13. Furthermore, the second washer member 72 is made from a soft material having flat faces, with a high degree of flatness, on the top and bottom faces thereof, and is arranged in contact with the top face of this first washer member 71. Accordingly, it is possible to limit variation in the gap between the second washer member 72 and second oil-impregnated bearing 33, and thus reduce variation in the thrust play.

Furthermore, in the brushless motor 1D in this example as well, the burring part 16 rises upward, which increases the retaining strength when the rotor case 13 is fastened to the rotary shaft 11, while allowing for an increase in the axial length of the first oil-impregnated bearing 32, which makes decreased shaft vibration possible.

Furthermore, in the brushless motor 1D in this example, when the rotary shaft 11 moves upwards, the hard-material first washer member 71 does not come into contact with the second oil-impregnated bearing 33, but rather the second washer member 72, which is made from a soft material, comes into contact with the second oil-impregnated bearing 33, allowing for a reduction in the impact sound caused by thrust play.

Furthermore, in the brushless motor 1D in this example, the outer diameters of the first washer member 71 and the second washer member 72 are smaller than the inner diameter of the cylinder 61 of the cylindrically shaped part 60. Accordingly, when the rotary shaft 11 moves upwards, the second washer member 72 reliably comes into contact with the second oil-impregnated bearing 33, without the first washer member 71 and the second washer member 72 coming into contact with the cylinder 61, whereby the rotary shaft 11 can easily slide.

Furthermore, in the brushless motor 1D in this example, the top face of the second oil-impregnated bearing 33 is in contact with the end plate 62. Accordingly, when the rotary shaft 11 moves upwards and thus the second washer member 72 comes into contact with the second oil-impregnated bearing 33, the end plate 62 stops the second oil-impregnated bearing 33, allowing for greater retaining strength for the second oil-impregnated bearing 33 in the axial direction, which allows for greater durability.

Furthermore, in the brushless motor 1D in this example, the inner diameter of the second oil-impregnated bearing 33 is formed slightly larger than the inner diameter of the first oil-impregnated bearing 32, such that, when driven under ordinary loads, the rotary shaft 11 is supported only by the first oil-impregnated bearing 32. Furthermore, when an excess load that exceeds normal loads is applied in the radial direction to the rotary shaft 11, from a non-illustrated driver gear, the rotary shaft 11 is supported by two bearings, these being the first oil-impregnated bearing 32 and the second oil-impregnated bearing 33.

Furthermore, when an excess load that exceeds normal loads applied in the axial direction to the rotary shaft 11, from a non-illustrated drive gear, because the second washer member 72 is in sliding contact with the second oil-impregnated bearing 33, the sliding resistance can be reduced as compared to cases such as in the second exemplary mode of embodiment, in which the second washer member 72 is in sliding contact with the end plate 62.

Fifth Exemplary Mode of Embodiment

Figure 5:
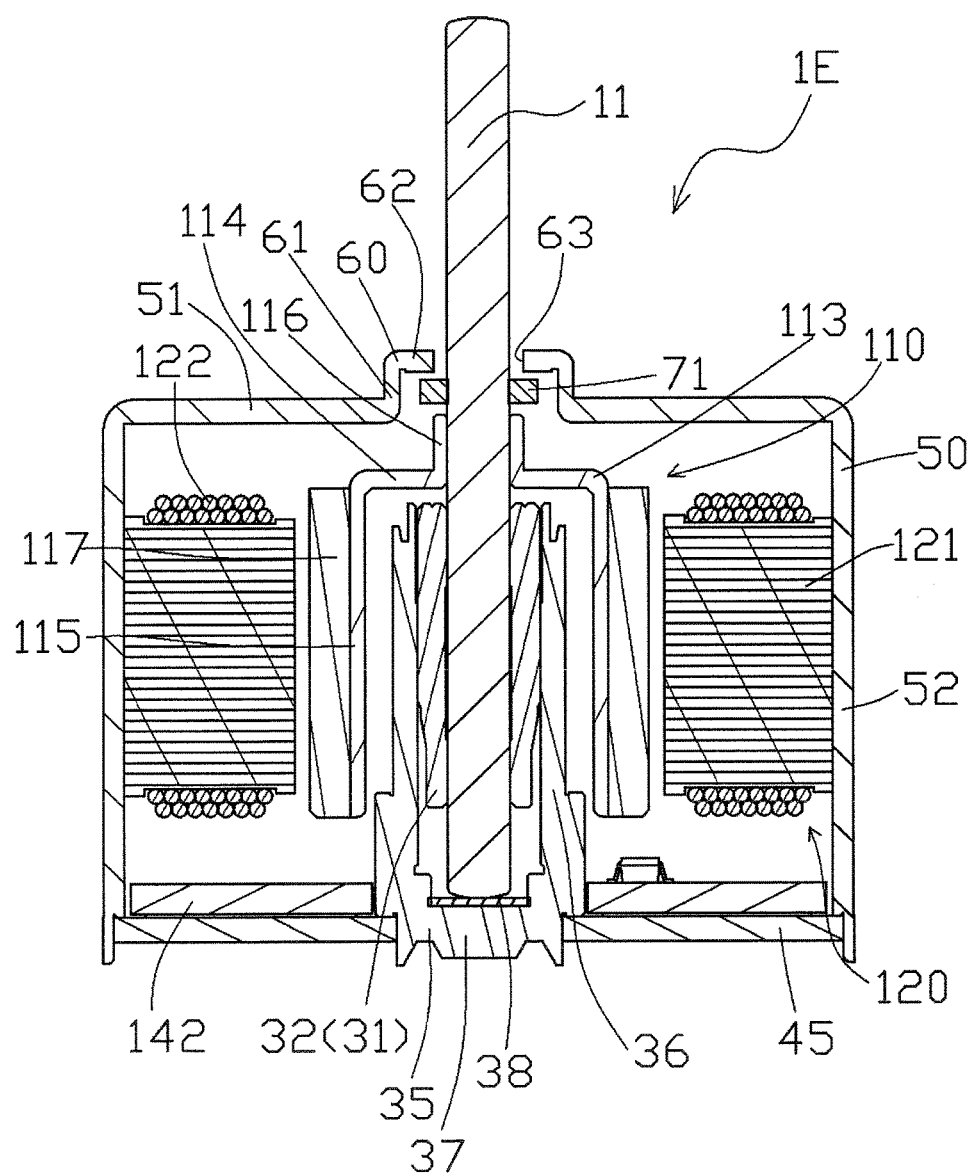
FIG. 5 is a sectional view of a brushless motor according to a fifth exemplary mode of embodiment of the present invention.

Next, the configuration of a brushless motor 1E according to a fifth exemplary mode of embodiment of the present invention is described by way of FIG. 5.

In FIG. 5, parts that are the same as parts in FIG. 1 to FIG. 4 are given identical reference numerals, and description of these parts is omitted.

In this example, the configuration of the rotor differs from that in the first through fourth exemplary modes of embodiment. That is to say, the first through fourth exemplary modes of embodiment were outer-rotor type brushless motors, covered by a cover member 50, but this example is an inner rotor type brushless motor covered by a cover member 50.

Hereafter, this example is described by way of comparison with the first exemplary mode of embodiment, but this example can also be applied to the second through fourth exemplary modes of embodiment.

The first exemplary mode of embodiment comprised a rotor case 13 fastened to a rotary shaft 11; a rotor 10 having a rotor magnet 17 fastened to the inner circumferential face of the rotor case 13; and a stator 20 arranged facing the rotor magnet 17 in the radial direction.

Meanwhile, this example comprises a rotor case 113 fastened to a rotary shaft 11; a rotor 110 having a rotor magnet 117 fastened to the outer circumferential face of the rotor case 113; and a stator 120 arranged facing the rotor magnet 117, in the radial direction.

More specifically, the stator 120 has a stator core 121, which is fastened to the inner circumferential face of the third cylindrical part 52 of the cover member 50. This stator core 121 is made from a laminate in which a plurality of core plates are laminated, and has a plurality of equidistant salient poles at the outer circumference thereof. Coils 122 are respectively wound on each of the salient polls.

A burring part 116 rises upward in the center of a roof 114 of the rotor case 113, and the rotary shaft 11 is fastened by press fitting in the burring part 116.

The first washer member 71 is disposed without contact with the top end of the burring part 116 or the end plate 62 of the cylindrically shaped part 60. That is to say, the first washer member 71 is disposed with a gap in the axial direction with respect to roof 51 of the cover member and the top plate 114 of the rotor case 113.

Next, the method of assembling the brushless motor 1E in this example will be described.

The rotary shaft 11, the rotor case 113, the first washer member 71 and the rotor magnet 117 are prepared.

First, the rotary shaft 11 is fastened by way of press fitting into the burring part 116 of the rotor case 113. The rotor magnet 117 is fastened to the outer circumferential face of the second cylindrical part 115 of the rotor case 113 that is fastened to the rotary shaft 11 (resulting in a rotor 110 having a rotary shaft 11). Then, the first washer member 71 having top and bottom faces with high degrees of flatness is press fit from above onto the rotary shaft 11 to which the rotor case 113 is fastened, by pushing the top face so as not to contact the burring part 116 of the rotor case 113 (resulting in a fourth assembly).

Next, the first oil-impregnated bearing 32, the bearing holder 35, the thrust receiving member 38, the wiring board 142 and the retaining plate 45 are prepared.

First, the thrust receiving member 38 is disposed on the bottom 37 of the bearing holder 35. Then, the first oil-impregnated bearing 32 is press fit into the opening in the bearing holder 35 so as to be fastened to the inner circumferential face thereof. Then, the retaining plate 45 having the wiring board 142 is fastened to the bottom 37 of the bearing holder 35 (resulting in a fifth assembly).

Next, the cover member 50, the stator core 121 and the coils 122 are prepared.

The coils 122 are wound on to the salient polls of the stator core 121 (resulting in a stator 120). Furthermore, the stator 120 is fastened, from below, to the inner circumferential face of the third cylindrical part 52 of the cover member 50 (resulting in a sixth assembly).

Next, the bottom end of the rotary shaft 11 in the fourth assembly is inserted from above into the first oil-impregnated bearing 32 in the fifth assembly. In this state, the cover member 50 of the sixth assembly covers the rotor 110 and the stator 120 from above, and the bottom end of the third cylindrical part 52 of the cover member 50 is fastened to the outer circumference of the retaining plate 45. Consequently, the rotary shaft 11 protrudes upward from the cover member 50, and a brushless motor 1E results.

This example has a similar operational effect to that in the first exemplary mode of embodiment, and because an inner rotor is used, the start-up time can be reduced as compared to using an outer rotor.

Furthermore, modes in which the second through fourth exemplary modes of embodiment are configured as inner rotor type brushless motors, as in this example, also have similar operational effects to those in the second through fourth exemplary modes of embodiment, and because an inner rotor is used, the start-up time can be reduced as compared to using an outer rotor.

Five exemplary modes of embodiment of the present invention have been described above, but the present invention is not limited to these exemplary modes of embodiment, and various modifications are possible.

Specifically, in the foregoing description, the profiles of the first washer member 71 and the second washer member 72 were formed so as to be circular, but the profiles of the first washer member 71 and the second washer member 72 may also be, for example, polygonal or elliptical.

Furthermore, in the foregoing description, the second oil-impregnated bearing 33 was fastened to the cylinder 61 and the cylindrically shaped part 60, having an end plate 62 provided at the top end of the cylinder 61, but the second oil-impregnated bearing 33 may be fastened to a cylindrically shaped part that does not have an end plate.

Furthermore, in the foregoing description, the internal diameter of the second oil-impregnated bearing 33 was formed slightly larger than the internal diameter of the first oil-impregnated bearing 32, but the inner diameter of the second oil-impregnated bearing 33 may be the same size as the inner diameter of the first oil-impregnated bearing 32.

Furthermore, in the foregoing description, the burring part 16, 116 rose upward from the center of the top plate 14, 114 of the rotor case 13, 113, but the burring part 16, 116 may descend downward from the top plate 14, 114 of the rotor case 13, 113.

Furthermore, in the foregoing description, the inner diameter of the second washer member 72 was formed substantially the same as the outer diameter of the rotary shaft 11, but the inner diameter of the second washer member 72 may be formed slightly larger than the outer diameter of the rotary shaft 11, and the second washer member 72 may be disposed rotatably, with respect to the rotary shaft 11.

Note that the roof 51 of the cover member serves as the mounting face when mounting the brushless motor in the mode of embodiment described above to, for example, a paper money transport device in a vending machine, and screw holes (not illustrated) for mounting are provided in the roof 51 of the cover member.

What is claimed is:

1. A brushless motor, comprising:
   a bearing holder having a cylindrical shape and being open at a top end and closed at a bottom end, the bearing holder having a first cylindrical portion and a bottom portion, the bottom portion closing the bottom end;
   a first oil-impregnated bearing fastened to an inner circumferential face of the first cylindrical portion;
   a rotary shaft rotatably supported by the first oil-Impregnated bearing;
   a rotor having a rotor case, which is fastened to the rotary shaft and has a second cylindrical portion and a top plate portion that closes a top end of the second cylindrical portion, and a rotor magnet fastened to a circumferential face of the second cylindrical portion;
   a stator, arranged so as to face the rotor magnet in the radial direction;
   a retaining plate fixed to said bottom portion and that extends outward in the radial direction from said bottom portion; and
   a cover member, which has a third cylindrical portion and a roof that closes a top end of the third cylindrical part, a bottom end of the third cylindrical portion being fastened to the retaining plate, so as to encase the rotor and the stator,
   wherein:
   the cover member has a through hole in the center of the roof;
   the rotary shaft protrudes upwards from the through hole without contact with the roof;
   a first washer member, which is made from a hard material and has a flat face, is fastened to the rotary shaft, between the top plate and the roof; and
   the first washer member is disposed without contact with the top plate or the roof.

2. The brushless motor according to claim 1, wherein a burring part, which fastens the rotary shaft, rises upward in the center or the top plate: and
   the first washer member is disposed without contact with the top end of the burring part.

3. The brushless motor according to claim 2, wherein a second washer member, which is made from a soft material and has a flat face, is provided on the rotary shaft between the first washer member and the roof; and
   the second washer member is disposed without contact with the roof.

4. The brushless motor according to claim 1, wherein the rotor magnet is fastened to the inner circumferential face of the second cylindrical portion;
   the stator has a stator core fastened to the outer circumferential face of the first cylindrical portion; and
   the stator core is disposed facing the inner circumferential face of the rotor magnet in the radial direction.

5. The brushless motor according to claim 2, wherein the rotor magnet is fastened to the inner circumferential face of the second cylindrical portion;
   the stator has a stator core fastened to the outer circumferential face of the first cylindrical portion; and
   the stator core is disposed facing the inner circumferential face of the rotor magnet in the radial direction.

6. The brushless motor according to claim 3, wherein the rotor magnet is fastened to the inner circumferential face of the second cylindrical portion;
   the stator has a stator core fastened to the outer circumferential face of the first cylindrical portion; and
   the stator core is disposed facing the inner circumferential face of the rotor magnet in the radial direction.

7. The brushless motor according to claim 1, wherein the retaining plate has an opening that receives said bottom portion of the bearing holder.

8. The brushless motor according to claim 7, having a bottom surface comprised by an outer surface of said retaining plate and an outer surface of said bottom portion of the bearing holder.

9. A brushless motor, comprising:
   a bearing holder having a cylindrical shape and being open at a top end and closed at a bottom end, the bearing holder having a first cylindrical portion and a bottom portion, the bottom portion closing the bottom end;
   a first oil-impregnated bearing fastened to an inner circumferential face of the first cylindrical portion;
   a rotary shaft rotatably supported by the first oil-impregnated bearing;
   a rotor having a rotor case, which is fastened to the rotary shaft and has a second cylindrical portion and a top plate that closes a top end of the second cylindrical portion, and a rotor magnet fastened to a circumferential face of the second cylindrical portion;
   a stator, arranged so as to face the rotor magnet in the radial direction;
   a retaining plate fixed to said bottom portion and that extends outward in the radial direction from said bottom portion;
   a cover member, which has a third cylindrical portion and a roof that closes a top end of the third cylindrical portion, a bottom end of the third cylindrical portion being fastened to the retaining plate, so as to cover the rotor and the stator; and
   a second oil-impregnated bearing, wherein:

the cover member has a cylinder in the center of the roof;

the second oil-impregnated bearing is fastened to the cylinder;

the rotary shaft protrudes upward from the cylinder, without contact with the second oil-impregnated bearing;

a first washer member, which is made from a hard material and has a flat face, is fastened to the rotary shaft, between the top plate and the second oil-impregnated bearing; and the first washer member is disposed without contact with the top plate or the second oil-impregnated bearing.

10. The brushless motor according to claim 9, wherein a burring part, which fastens the rotary shaft, rises upward in the center or the top plate; and the first washer member is disposed without contact with the top end of the burring part.

11. The brushless motor according to claim 10, wherein: a second washer member, which is made from a soft material and has a flat face, is provided on the rotary shaft, between the first washer member and the second oil-impregnated bearing; and the second washer member is disposed without contact with the second oil-impregnated bearing.

12. The brushless motor according to claim 11, wherein the outer diameters of the first washer member and the second washer member are smaller than the inner diameter of the cylinder.

13. The brushless motor according to claim 12, wherein: an end plate is integrally formed at the top end of the cylinder; and the top face of the second oil-impregnated bearing contacts the end plate.

14. The brushless motor according to claim 9, wherein: the rotor magnet is fastened to the inner circumferential face of the second cylindrical portion;

the stator has a stator core fastened to the outer circumferential face of the first cylindrical portion; and the stator core is disposed facing the inner circumferential face of the rotor magnet in the radial direction.

15. The brushless motor according to claim 10, wherein: the rotor magnet is fastened to the inner circumferential face of the second cylindrical portion;

the stator has a stator core fastened to the outer circumferential face of the first cylindrical portion; and the stator core is disposed facing the inner circumferential face of the rotor magnet in the radial direction.

16. The brushless motor according to claim 11, wherein: the rotor magnet is fastened to the inner circumferential face of the second cylindrical portion;

the stator has a stator core fastened to the outer circumferential face of the first cylindrical portion; and the stator core is disposed facing the inner circumferential face of the rotor magnet in the radial direction.

17. The brushless motor according to claim 12, wherein the rotor magnet is fastened to the inner circumferential face of the second cylindrical portion;

the stator has a stator core fastened to the outer circumferential face of the first cylindrical portion; and the stator core is disposed facing the inner circumferential face of the rotor magnet in the radial direction.

18. The brushless motor according to claim 13, wherein: the rotor magnet is fastened to the inner circumferential face of the second cylindrical portion;

the stator has a stator core fastened to the outer circumferential face of the first cylindrical portion; and the stator core is disposed facing the inner circumferential face of the rotor magnet in the radial direction.

19. The brushless motor according to claim 9, wherein the retaining plate has an opening that receives said bottom portion of the bearing holder.

20. The brushless motor according to claim 19, having a bottom surface comprised by an outer surface of said retaining plate and an outer surface of said bottom portion of the bearing holder.

* * * * *